United States Patent [19]

Wu et al.

[11] Patent Number: 4,762,417
[45] Date of Patent: Aug. 9, 1988

[54] FRINGE SCANNING POINT DIFFRACTION INTERFEROMETER BY POLARIZATION

[75] Inventors: Shudong Wu; Xiangzhen Chen; Xiou Tao, all of Shanghai, China

[73] Assignee: Shanghai Institute of Optics and Fine Mechanics, Academia Sinica, Shanghai, China

[21] Appl. No.: 879,000

[22] Filed: Jun. 26, 1986

[30] Foreign Application Priority Data

Aug. 6, 1985 [CN] China ................................ 85106007

[51] Int. Cl.⁴ .............................................. G01B 9/02
[52] U.S. Cl. ..................................... 356/351; 356/354
[58] Field of Search ............... 356/351, 354, 359, 360; 350/403, 406

[56] References Cited

U.S. PATENT DOCUMENTS 4,575,247 3/1986 Tansey .................................. 356/354
4,624,569 11/1986 Kwon .................................. 356/354

Primary Examiner—Vincent P. McGraw
Assistant Examiner—S. A. Turner
Attorney, Agent, or Firm—Russell E. Hattis; Lawrence J. Bassuk

[57] ABSTRACT

A polarization fringe scanning digital interferometer includes an encoder for performing a phase polarization encoding on the wavefront coming from the optical component under test as it passes through the encoder. The encoded wavefront then passes through an analyzer into a video camera to produce electrical signals representing the interference pattern. The encoder includes in sequence, a polarizer having an adjustable polarization axis, a polarization film providing a polarization pinhole through the film and a quarter wave plate that preferably is a Fresnel plate.

10 Claims, 2 Drawing Sheets

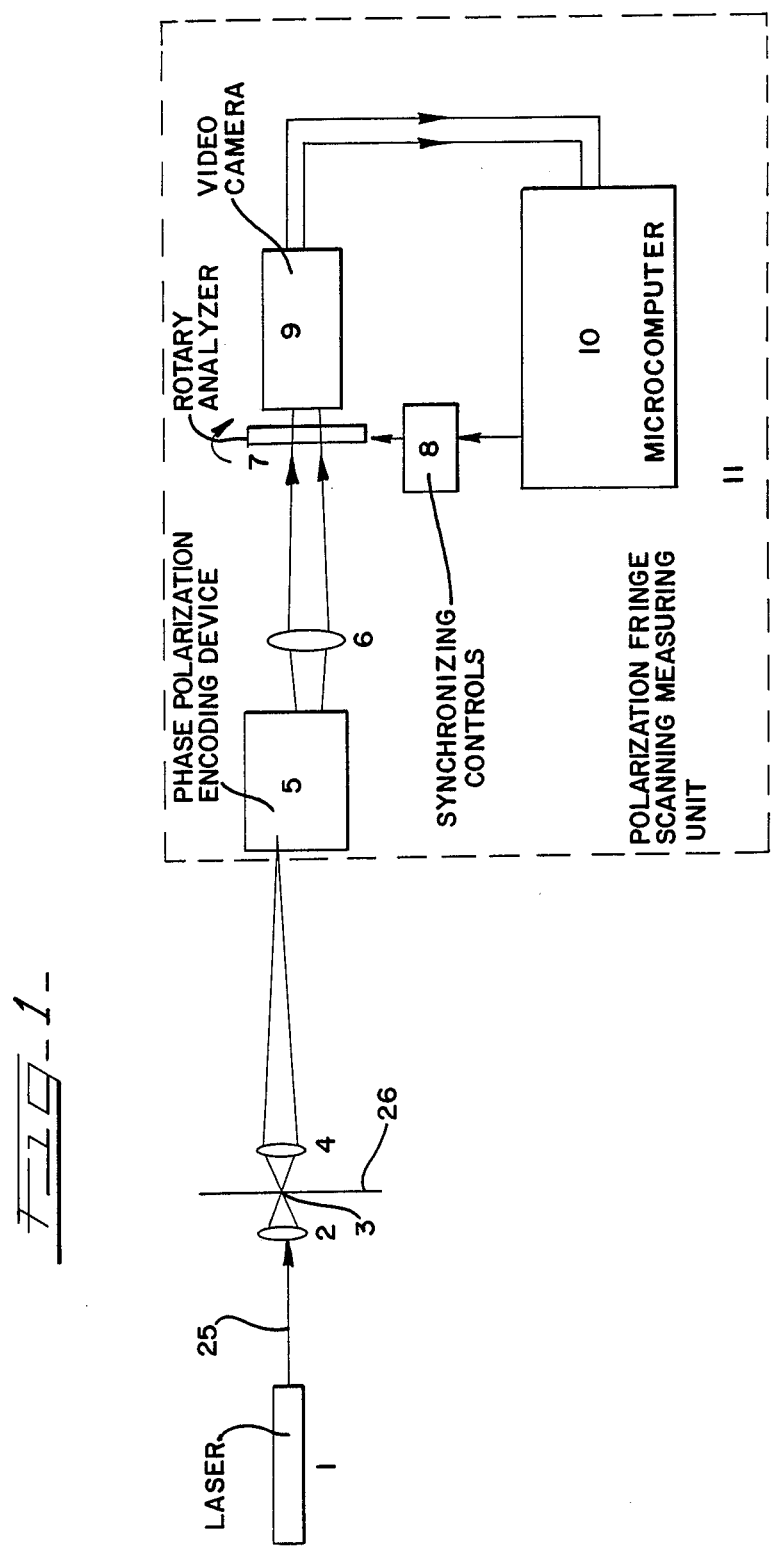

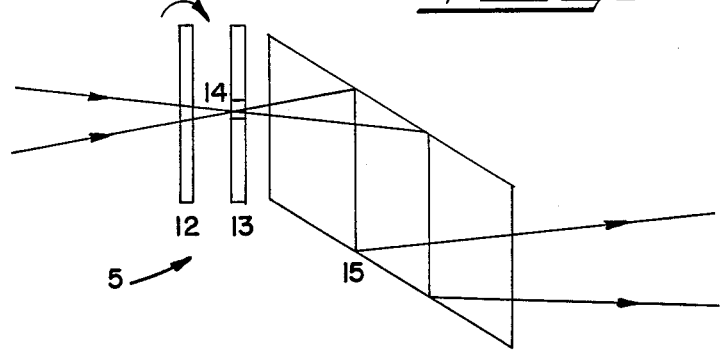
FIG-2-
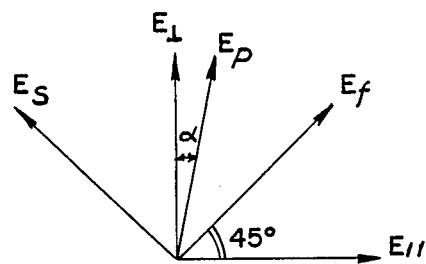
FIG-3-
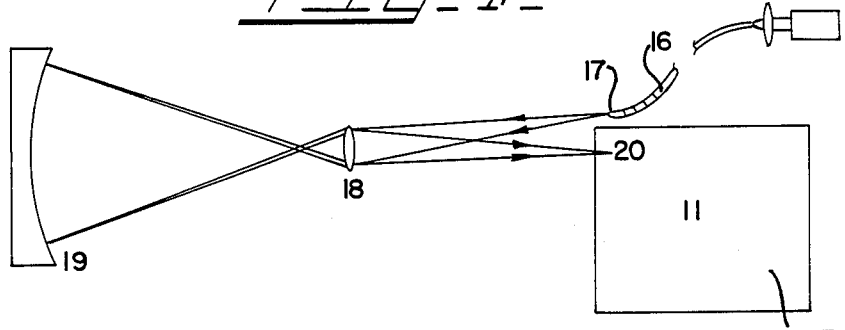
FIG-4-
POLARIZATION
FRINGE SCANNING
MEASURING
UNIT
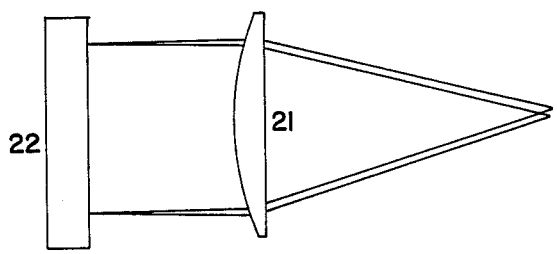
FIG-5-

FRINGE SCANNING POINT DIFFRACTION INTERFEROMETER BY POLARIZATION

TECHNICAL FIELD

The present invention relates to a kind of interferometer which is used in examining optical qualities of various optical components. More particularly, this invention relates to fringe scanning digital interferometer.

BACKGROUND OF THE INVENTION

Fringe scanning digital interferometer was first proposed by J. H. Burning et al of Bell Telephone Company of United States in 1974 (Appl. Opt. 1974, Vol 13, No.11. P2693), and then was commercialized by TROPEL Company and ZYGO company (M. Sohaham SPIE, 1981, Vol 306 183; U.S. Pat. No. 4,201,473). Today it has become the most effective tool for high accuracy wavefront measurements.

In the fringe scanning digital interferometer of the prior art, for example, ZYGO interferometer, it comprises light source, fringe scanning interference unit, photoelectric measurement means and data processing system, where the fringe scanning is carried out by varying the distance passed by one interference beam using piezoelectric crystal. However, this method has following disadvantages:

1. It is hard to control the piezoelectric crystal with high precision;
2. A two beam interference means must be employed, in which the measurement system is very sensitive to turbulence and external vibrations, so a very critical environment, where the measurement is carried out, is required;
3. A high accuracy reference wavefront is needed. It also requires other high quality optical components;
4. The light source must be a frequency-stabilized laser;
5. The interference fringes are unstable, so it is hard to observe the zeroth-order interference fringe of aberration;
6. The apparatus has a complicated structure.

To eliminate above disadvantages, the inventor of the present invention proposed a new kind of fringe scanning principle, polarization fringe scanning, in the 13th international conference on optics in Japan, August, 1984, and submitted an article of "Polarization Fringe Scanning Interferometer" to "Acta Optica Sinica" to make a further exposition of the polarization fringe scanning principle (Acta Optica Sinica, 1985. Vol. 5, No. 2).

SUMMARY OF THE INVENTION

The object of the present invention is to provide a kind of practical apparatus based on the principle of polarization fringe scanning digital interferometer proposed by the inventor, and to provide practical optical path and means of testing qualities of various optical components, such as lens, spherical mirror and flat mirror etc, and the method of using the apparatus.

The technical scheme adopted in the present invention in as follows. The wavefront measurement is reduced to Airy spot measurement and a co-optical-path interference is employed. The phase distribution $\phi(X,Y)$ under test is encoded as the distribution of the polarization angle $\phi(x,y)/2$
by means of a phase polarization encoding of the present invention, and then the fringe scanning is carried out by using a rotary analyzer. The interferograms are photographed by a video camera and sent to a micro-computer for processing.

If N positions are taken within the interval of polarization angle $(0, \pi)$, the intensity distributions $I(X,Y,K)$ of the corresponding N pictures of interference fringes can be measured. The relative phase $\phi(X,Y)$ between different points, which is just the wavefront distribution, can be calculated by using the principle of digital synchronous detection:

$$\phi(X,Y) = \tan^{-1} \frac{A}{B}$$

where $$A = \sum_{k=1}^{N} I(X,Y,K) \sin \frac{2\pi}{N} K, \quad B = \sum_{k=1}^{N} I(X,Y,K).$$

The phase polarization encoding device (as shown in FIG. 2) of the present invention is composed of a polarizer (12), a polarization pinhole (14) on a polarization film (13) and a quarter wave plate (15). The orientations of these polarization components are shown in FIG. 3, where $E_p$ is the polarization axis of the polarizer (12), $E_\perp$ and $E_\parallel$ are the extinction and transmission axes of the polarization film (13) respectively, $E_f$ and $E_s$ are the fast and slow axes of the quarter wave plate (15) respectively. The angles between $E_f$ and $E_\parallel$, $E_s$ and $E_\perp$ are both 45°. When the Airy spot of a convergent wavefront under test passes through the polarizer (12) and then falls on the polarization pinhole (14), the pinhole which can be viewed as a standard point source creates a reference wavefront whose polarization is along $E_\perp$. Since the incident polarization $E_p$ has a component parallel to $E_\parallel$, the wavefront under test has a transmissive component whose polarization is along $E_\parallel$. The amplitudes of the reference wavefront and the wavefront under test can be made equal by changing the angle between $E_p$ and $E_\perp$ by means of adjustment of the orientation of the polarizer (12). After passing through the quarter wave plate (15) they are converted into left and right circular polarization respectively, combination of which become a linear polarization whose polarization angle is half of the difference between their phases i.e. $\phi(x,y)/2$. The polarization encoding of the phases is thus carried out.

The said phase polarization encoding device is suitable to any wavefront, provided that it is converged to a Airy spot, and falls on the polarization pinhole (14).

The polarization fringe scanning digital interferometer has following advantages in comparison with the fringe scanning interferometers of the prior art:

1. a rotary analyzer is employed in scanning, where a rotation of 180° corresponds to a change of one wavelength, it is therefore very easy to control with high precision, which in turn makes the sensitivity of the measurement very high.
2. Becasue of the co-optical-path interference, the apparatus is insensitive to turbulence and external vibrations. Therefore it can work well in ordinary environment.
3. The apparatus does not require high quality optical components, especially no high accuracy reference wavefront is needed in measuring lenses, a standard pinhole is enough to make the apparatus work.

4. It is not necessary to employ a frequency-stabilized laser as the laser source.

5. The interference fringes are very stable. It is easy to be adjusted to zeroth-order interference. The measurements of aberration and the wavefront are also intuitive.

6. Its structure is simple with a few optical components.

7. The wavefront measurement is reduced to Airy spot measurement in this technique, which can give high precision quantitative results and makes the traditional qualitative Airy spot measurement quantitative.

BRIEF DESCRIPTION OF THE DRAWINGS

FIG. 1 shows the optical path of a practical apparatus for measuring lenses and microscope objectives.

FIG. 2 is a schematic diagram of the structure of the phase polarization code device.

FIG. 3 shows the arrangement of the orientations of various polarization components of the phase polarization code device of the present invention.

FIG. 4 shows the optical path of a practical apparatus for measuring spherical surface.

FIG. 5 shows a part of the optical path of measuring flat a surface.

DETAILED DESCRIPTION

The following are detailed explanations of the present invention with reference to the drawings and the embodiments.

In FIG. 2 (12) is a polarizer, (13) is a polarization film having a pinhole (14) on it, i.e. the polarization pinhole, the diameter of which ranges from 3 $\mu m$ to 20 $\mu m$, (15) is a quarter wave plate. The orientations of these polarization components are shown in FIG. 3. The adjustable polarizer (12) can change the angle between the direction of the polarization axis $E_p$ of the polarizer and the transmission direction of polarization pinhole (i.e. the extinction axis of polarization film) in such a way that the contrast of the interference fringes becomes maximum. The polarizer (12) should be as close as possible to the polarization pinhole, for example, 1mm–10 mm, so that the apparatus is not effected by the depolarization effect of the component under test (particularly in testing a microscope), that the requirement of a high quality polarizer is avoided because only a small area of the polarizer is employed, that it won't cause extra spherical aberration since the aperture angle of the light beam incident upon the polarization prinhole is small.

The quarter wave plate (15) can be any quarter wave plate. However, it is preferred to use Fresnel plate as the quarter wave plate, because it is difficult to process the usual wave plate with high accuracy. The ordinary quartz plate is glued together, therefore it cannot undergo heat, and high quality anti-reflection film cannot be coated on it. A high accuracy phase shift for a broad band of wavelength can be achieved by using Fresnel plate on whose end surfaces can be coated.

FIG. 1 is a diagram of the optical path of a practical apparatus for measuring lenses and microscope objectives. what is inside the frame of the dotted line is the main part of the polarization fringe scanning digital interferometer of the present invention, that is, the polarization fringe scanning measuring unit (11), including said phase polarization encoding device (5), a rotary analyzer (7), a video camera (9), a microcomputer (10) and a synchronizing controls controlled by said microcomputer. It is prefered to insert an image formation lens (6) between the phase polarization encoding device (5) and the rotary analyzer (7) so that the images of the interference fringes can be formed clearly on the object plane of the video camera (9).

In measuring lenses or microscope objectives the polarization fringe scanning digital interferometer works as follows:

A laser beam 25 emitted by a laser (1) is focused by a focus lens (2) on a pinhole (3), which is on the object plane 26 of a lens under test, and taken as a standard point light source, whose image falls on the polarization pinhole (14) of a phase polarization encoding device (5) (cf. FIG. 2), and then polarization encoding of the wavefront under test is carried out. After passing through the image formation lens (6) and the rotary analyzer (7), the fringe scanning is carried out. The interferagram falls on the object plane of the video camera (9) and is photographed by it, and then is sent to the microcomputer for data processing. In the process of testing the microcomputer (10) controls the synchronizing control unit (8) comprising, for example, stepping motor, to sychronize the rotary analyzer (7) with the video camera (9) in order to achieve synchronous polarization fringe scanning and synchronous measurement.

FIG. 4 is a diagram of the optical path of a practical apparatus for testing spherical surface. The light emitted by the laser (1) which couples in a single-mode optical fiber (16) is directed onto a near-axis image point (17) of a microscope objective (18) to form a point light source. The center of a spherical surface (19) under test is on the axis of the object plane of the microscope objective (18). The laser beam is reflected by the spherical surface (19) under test and passes through the microscope objective (18) to form an image on the image plane at the position which is symmetric with the point source (17). This image is just the Airy spot (20) and coincide with the polarization pinhole (14) of phase polarization code device (5) in the polarization fringe scanning measuring unit (11). The spherical surface can be tested by said polarization fringe scanning measuring unit.

In fact, the test can be performed provided the light emitted by the laser (1) is directed onto a near axis image point (17) and forms a point light source in the foregoing optical path of the practical apparatus. The test is independent on the way by which the light is directed. However employing a single mode optical fiber (16) to direct light and using its end as the standard point source make the connection between the laser and the interferometer more flexible.

In the test, the point source (17) and the image point (20) must be close enough to each other, for example, 2 mm–5 mm, so that their conjugate points on the object phase of the microscope objective are very close to its optical axis. Therefore no extra coma aberration is caused by the measurement.

FIG. 5 is a part of the optical path for measuring a flat surface. A collimator (21) is used instead of the spherical surface (19) in FIG. 4 to test the flat surface (22) in FIG. 5.

It will be understood by those skilled in the art that numerous changes, modifications and improvements may be made to the embodiments disclosed herein without departing from the spirit and scope thereof, and the same area intended to be comprehended within the meaning and range of equivalents of the appended claims.

What is claimed is:

1. A polarization fringe scanning digital interferometer for testing optical quality of optical components, comprising:
   A. laser means for producing a beam of light adapted to be passed to an optical component under test;
   B. device means adapted to receive said beam of light from said optical component under test for performing a phase polarization encoding on the wavefront of said beam of light as it passes through said device means;
   C. analyzer means capable of being rotated for transmitting said phase polarization encoded wavefront;
   D. camera means receiving said encoded wavefront transmitted by said analyzer means for producing video signals representing said encoded wavefront;
   E. computer means for processing said video signals from said camera means and producing control signals relating to a desired rotation of said analyzer means; and
   F. synchronizing means for rotating said analyzer means in response to said control signals to achieve synchronous polarization fringe scanning and synchronous measurement.

2. The interferometer of claim 1 in which said device means include a polarizer having an adjustable polarization axis, a polarization film providing a polarization pinhole through the film, and a quarter wave plate arranged for said wavefront sequentially to strike said polarizer, polarization film and quarter wave plate.

3. The interferometer of claim 2 in which said polarization pinhole has a diameter of approximately from 3 to 20 micrometers and said polarizer is arranged approximately 1–10 millimeters from said pinhole.

4. The interferometer of claim 1 in which said quarter wave plate is a Fresnel plate.

5. The interferometer of claims 1 or 2 including an image formation lens arranged between said device means and said analyzer means to focus said encoded wavefront on said camera means.

6. A practical light beam path used in said interferometer of claim 2 in which said optical component under test is a lens and including a focus lens that focuses said beam produced from said laser means on an object pinhole located on the object phase of said lens under test to provide a standard point light source whose image point falls on said pinhole of said polarization film to encode the wavefront from said lens under test, said camera means producing interferograms to said computer means for data processing.

7. A practical light beam path used in said interferometer of claim 2 in which said optical component under test is a spherical surface, including a microscope objective arranged to transmit light to and from said spherical surface, said spherical surface having a center located on the axis of the object plane of said microscope objective and in which said laser means forms a point light source of said beam on a near-axis image point of said microscope objective, said beam passing through said microscope objective to said spherical surface, being reflected from said spherical surface back through said microscope objective and being focused on an image point symmetric with said point source, said image point coinciding with said pinhole of said polarization film of said device means to effect said test of said spherical surface.

8. The path of claim 7 in which said laser means include a single-mode optical fiber to direct said light beam to said point light source.

9. The paths of claims 7 or 8 in which said point source and said image point are substantially within 2–5 millimeters of one another.

10. A practical light beam path used in said interferometer of claim 2 in which said optical component under test is a flat surface, including a collimator arranged to transmit light to and from said flat surface, and in which said laser means include a single-mode optical fiber to form a point light source of said beam on a near-axis image point of said collimator, said beam passing through said collimator to said flat surface, being reflected from said flat surface back through said collimator and being focused on an image point symmetric with said point source, said image point coinciding with said pinhole of said polarization film of said device means to effect said test of said flat surface.

* * * * *